(12) United States Patent
Taber

(10) Patent No.: US 7,347,085 B2
(45) Date of Patent: Mar. 25, 2008

(54) NANOSCALE DISPLACEMENT DETECTOR

(75) Inventor: Robert C. Taber, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 287 days.

(21) Appl. No.: 11/280,365

(22) Filed: Nov. 16, 2005

(65) Prior Publication Data
US 2007/0107501 A1    May 17, 2007

(51) Int. Cl.
*G02B 7/04* (2006.01)
(52) U.S. Cl. .......................................... 73/105; 356/501
(58) Field of Classification Search ..................... None
See application file for complete search history.

(56) References Cited

U.S. PATENT DOCUMENTS 5,969,821 A * 10/1999 Muramatsu et al. ......... 356/613
6,028,693 A * 2/2000 Fork et al. ................... 359/248
6,713,743 B2 * 3/2004 Kim et al. ................ 250/201.3
2005/0264825 A1 * 12/2005 Frederix et al. ............. 356/501

OTHER PUBLICATIONS

Akahane, Yoshihiro, Asano, Takashi, Song, Bong-Shik, Noda, Susumu, "Fine-tuned high-Q photonic-crystal nanocavity," Feb. 21, 2005/ vol. 13, No. 4/ Optics Express pp. 1202-1214.
Akahane, Yoshihiro, Asano, Takashi, Song, Bong-Shik, Noda, Susumu, "High-Q photonic nanocavity in a two-dimensional photonic crystal," Oct. 30, 2003/ vol. 425/NATURE, pp. 944-947.

* cited by examiner

*Primary Examiner*—Robert Raevis

(57) ABSTRACT

A nanoscale displacement detector includes a cantilever integrated with an optical resonator, referred to herein as a "microresonator." The microresonator and cantilever are configured such that displacement of the cantilever relative to the microresonator causes a change in the resonant frequency of the microresonator. The change in the resonant frequency of the microresonator is used to monitor cantilever displacement. In an embodiment, the microresonator includes a cavity that faces the cantilever and the cantilever includes a protrusion that faces the microresonator and is aligned with the cavity.

21 Claims, 6 Drawing Sheets

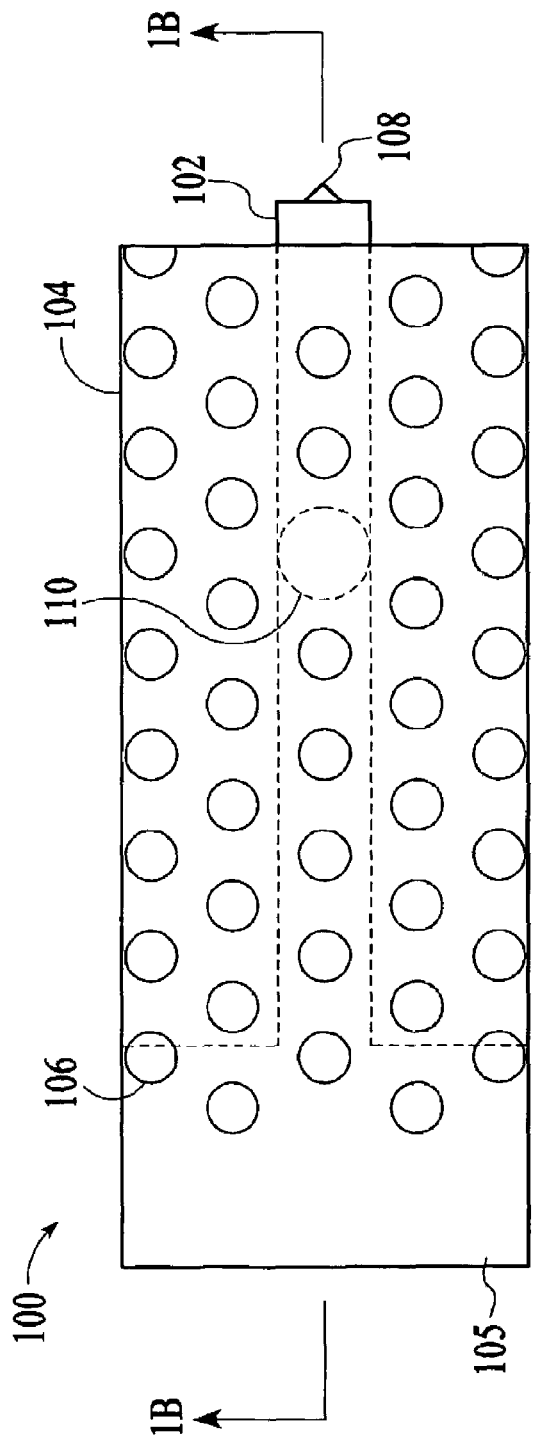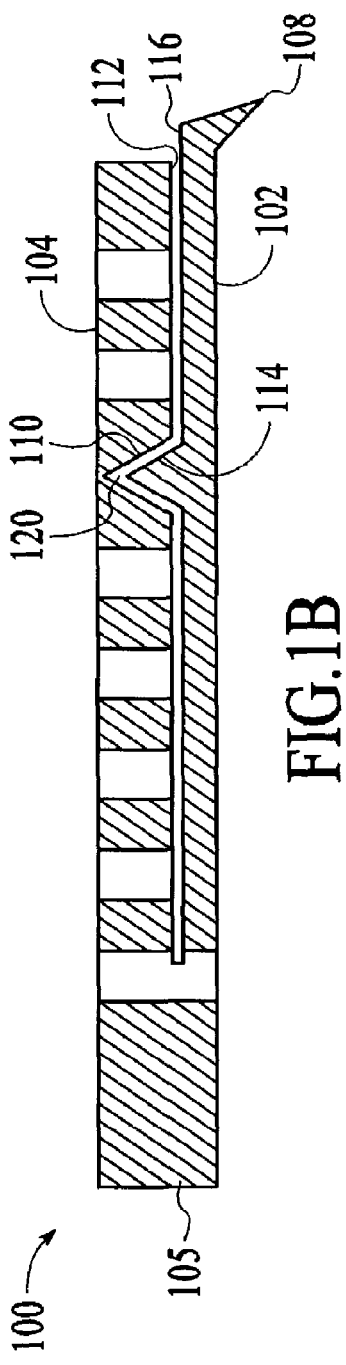
FIG.1A
FIG.1B

NANOSCALE DISPLACEMENT DETECTOR

BACKGROUND OF THE INVENTION

Atomic force microscopy (AFM) involves monitoring the displacement of a sharp probe tip as it is scanned over a sample. The probe tip is usually attached to a cantilever and displacement of the probe tip can be monitored using many different techniques. One widely-used technique for monitoring displacement of the probe tip involves reflecting a laser beam off the cantilever and detecting angular deflection of the reflected laser beam using a position-sensitive detector having two adjacent photodiodes. Angular deflection of the cantilever causes a two-fold larger angular deflection of the laser beam and the difference between the output signals of the two photodiodes indicates the position of the laser beam. The position of the laser beam relative to the two adjacent photodiodes indicates the angular deflection of the cantilever and thus the displacement of the probe tip.

Although a displacement monitoring technique that relies on deflection of a laser beam is quite sensitive, the sensitivity of the technique is limited by the maximum laser power that can be conveyed to the detector and the diffraction limit set by the cross-sectional size of the laser beam that is incident on the cantilever and the position-sensitive detector.

SUMMARY OF THE INVENTION

A nanoscale displacement detector includes a cantilever integrated with an optical resonator, referred to herein as a "microresonator." The microresonator and cantilever are configured such that displacement of the cantilever relative to the microresonator causes a change in the resonant frequency of the microresonator. The change in the resonant frequency of the microresonator is used to monitor cantilever displacement.

In an embodiment, the microresonator includes a cavity that faces the cantilever and the cantilever includes a protrusion that faces the microresonator. The cavity of the microresonator and the protrusion of the cantilever are shaped complementary to each other and are aligned such that the protrusion of the cantilever fits within the cavity of the microresonator. The cavity and the protrusion are sized and oriented with respect to each other such that the protrusion partially fills the cavity leaving a void space between the two structures. The resonant frequency of the microresonator is a function of the volume of the void space between the two structures and the volume of the void space changes with displacement of the cantilever relative to the microresonator. Because the resonant frequency of the microresonator is a function of the volume of the void space between the cavity and the protrusion, displacement of the cantilever relative to the microresonator causes a change in the resonant frequency of the microresonator. Changes in the resonant frequency of the microresonator are utilized to monitor displacement of the cantilever relative to the microresonator. Changes in the resonant frequency of the microresonator can be monitored by injecting light into the microresonator and measuring the light output.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 1A and 1B depict top and cross-sectional views, respectively, of an embodiment of a nanoscale displacement detector that includes a cantilever connected to a microresonator.

Throughout the description similar reference numbers may be used to identify similar elements.

DETAILED DESCRIPTION

Figure 2:
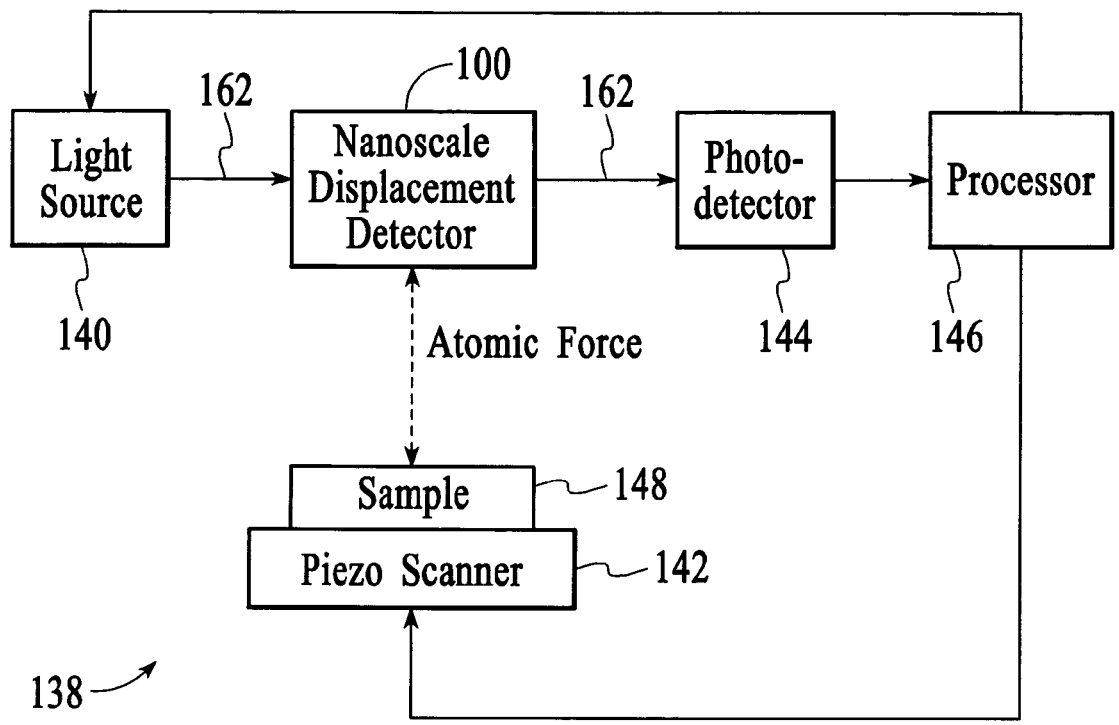
FIG. 2 depicts a system for use in AFM that includes a nanoscale displacement detector as described above with reference to FIGS. 1A and 1B.

A nanoscale displacement detector includes a cantilever integrated with a microresonator. The microresonator and cantilever are configured such that displacement of the cantilever relative to the microresonator causes a change in the resonant frequency of the microresonator. The change in the resonant frequency of the microresonator is used to monitor cantilever displacement.

Nanoscale photonic bandgap (PBG) optical resonators, referred to herein as "microresonators," are known to exhibit high Q values, for example, on the order of 40,000 or more, where the Q is defined as the resonant frequency divided by the resonance spectrum at full-width half maximum (FWHM). Examples of high Q PBG microresonators are described, for example, in the article "Fine-tuned high-Q photonic crystal nanocavity" Akahane et al., 21 Feb. 2005, Vol. 13, No. 4, Optics Express 1202, and "High-Q photonic nanocavity in a two-dimensional photonic crystal," Noda, et al., Nature, Vol. 425, p.944, October 2003, which are incorporated by reference herein.

In accordance with the invention, a cantilever is integrated with a microresonator to form a nanoscale displacement detector that can be used in AFM. The microresonator and cantilever are configured such that displacement of the cantilever relative to the microresonator causes a change in the resonant frequency of the microresonator. The change in the resonant frequency of the microresonator is used as an indicator of cantilever displacement. An exemplary configuration of a nanoscale displacement detector is described with reference to FIGS. 1A and 1B. Although an exemplary configuration is described, other configurations of the nanoscale displacement detector are possible.

FIGS. 1A and 1B depict a top view and a cross-sectional view, respectively, of a nanoscale displacement detector 100 that includes a cantilever 102 connected to a microresonator 104. The microresonator is a high Q "defect" type PBG microresonator that includes a substrate 105 and an array of dielectric discontinuities 106 arranged in a repeating pattern throughout the substrate. The microresonator also includes a "defect" or cavity 110, which is a dielectric discontinuity that is large compared to the other dielectric discontinuities 106. The dielectric discontinuities and the cavity together form a structure that is resonant at an optical frequency. Many different techniques for creating the microresonator are known in the field of PBG design. Although a defect type PBG microresonator is described herein, other resonator types are possible. The cantilever may be fabricated by standard micromachining techniques and includes a probe tip 108 that is formed, for example, in situ or attached to the cantilever. The cantilever is coupled to the microresonator at the end that is remote from the probe tip.

In the embodiment of FIGS. 1A and 1B, the cavity 110 is formed at a surface 112 of the microresonator 104 that faces the cantilever 102. The cavity is shaped as an inverted cone although the cavity could have a different shape. The cantilever includes a protrusion 114 formed at a surface 116 that faces the microresonator. The cavity of the microresonator and the protrusion of the cantilever are shaped complementary to each other and are aligned such that the protrusion of the cantilever fits within the cavity of the microresonator. The cavity of the microresonator and the protrusion are sized and oriented with respect to each other such that the protrusion partially fills the cavity leaving a void space 120 between the two structures. The volume of the void space between the two structures determines the effective dielectric constant and dimensions of the microresonator and therefore affects the resonant frequency of the microresonator. A decrease in the volume of the void space causes the resonant frequency to decrease while an increase in the volume of the void space causes the resonant frequency to increase. The volume of the void space between the cavity and the protrusion is fixed as long as the position of the cantilever remains fixed relative to the microresonator.

In an embodiment, the nanoscale displacement detector is formed by first fabricating the microresonator using conventional techniques. For example, the microresonator is fabricated using photolithography or e-beam lithography to create the dielectric discontinuities 106 in substrate 105. Cavity 110 is then defined extending into the microresonator from one of its major surfaces, e.g., the bottom surface. Next, a sacrificial layer is applied to the major surface of the microresonator and the cantilever is formed by depositing a layer of material on top of the sacrificial layer. The layer is then patterned using a lithographic technique to define the cantilever. The cantilever can be anchored to the microresonator by creating openings in the sacrificial layer in a region of the sacrificial layer remote from the probe tip. Alternatively, the cantilever can be coupled to the microresonator via a common member, for example, an intermediate layer located between the microresonator and the cantilever. The sacrificial layer between the microresonator and the cantilever is then removed such that the cantilever is free to move relative to the microresonator. Although one technique for forming the nanoscale displacement detector is described, other techniques are possible.

The volume of the void space 120 between the cavity 110 and the protrusion 114 changes with displacement of the cantilever 102 relative to the microresonator 104. In particular, displacement of the cantilever towards the microresonator decreases the volume of the void space and displacement of the cantilever away from the microresonator increases the volume of the void space. Because the resonant frequency of the microresonator is a function of the volume of the void space between the cavity and the protrusion, displacement of the cantilever relative to the microresonator causes a change in the resonant frequency of the microresonator. Changes in the resonant frequency of the microresonator are utilized to monitor displacement.

Changes in the resonant frequency of the microresonator 104 are utilized to monitor displacement by, for example, injecting light into the microresonator and measuring the light that is either transmitted through the microresonator or reflected by the microresonator. Many different configurations of optical systems can be used to channel light to and from the microresonator. FIG. 2 depicts a system 138 for use in AFM that includes a nanoscale displacement detector 100 as described above with reference to FIGS. 1A and 1B, a light source 140, a piezo scanner 142, a photodetector 144, and a processor 146. A sample 148 that is to be scanned is placed between the nanoscale displacement detector and the piezo scanner. In the example of FIG. 2, the light source is a laser light source that outputs a laser beam with a narrow linewidth. For example, the laser beam has a wavelength in the 1,500 nm wavelength range and has a linewidth of 10 kHz. The photodetector is a photodiode that outputs an electrical signal proportional to the intensity of the received optical energy. The processor converts the output signal from the photodetector into image information and provides control signals to control the piezo scanner and the light source. The piezo scanner adjusts the position of a sample in response to signals from the processor.

Figure 3:
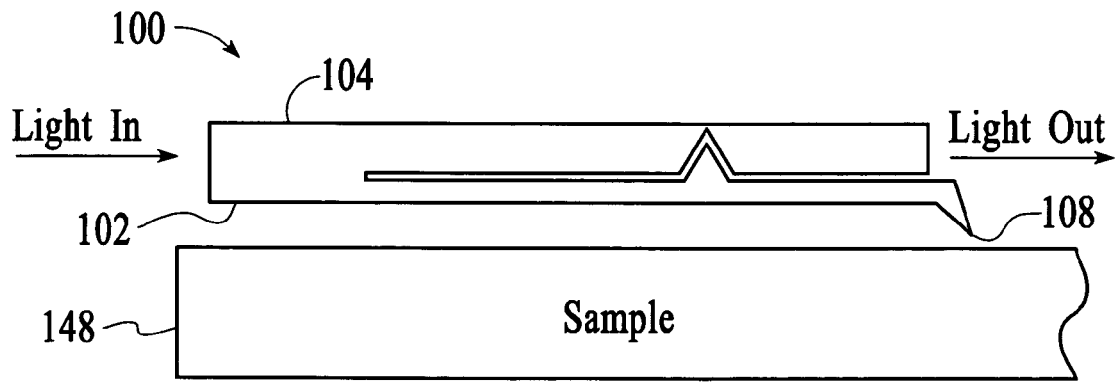
FIG. 3 depicts the nanoscale displacement detector from FIGS. 1A and 1B relative to a sample.

The nanoscale displacement detector 100 of the system 138 is responsive to the surface of the sample 148. In particular, as depicted in FIG. 3, the probe tip 108 of the cantilever 102 interacts with the surface of the sample 148 to detect differences in the surface profile of the sample. An image of the sample's surface is obtained by scanning the probe tip of the cantilever across the desired image area. In a typical scanning operation, the distance between the nanoscale displacement detector and the sample is maintained constant by adjusting the separation between the cantilever and the sample in response to displacement indications from the nanoscale displacement detector.

Figure 4:
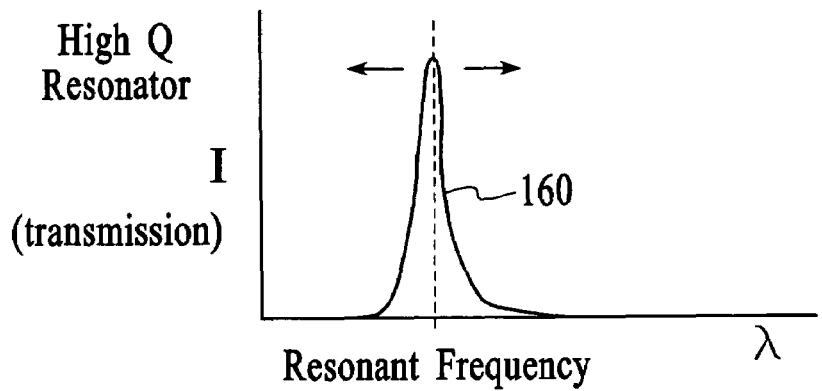
FIG. 4 depicts an example resonant spectrum of a high Q PBG microresonator, with the resonant frequency being identified as the peak of the resonant spectrum.
Figure 5A:
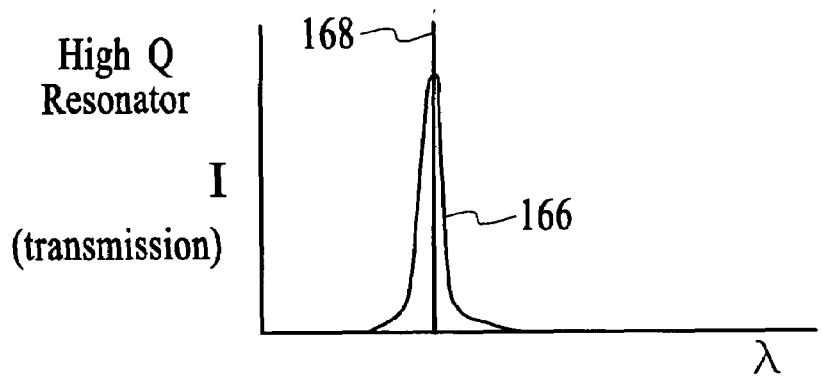
FIG. 5A is a graph of the spectrum of a microresonator and the spectrum of a laser beam in the case where the frequency of the laser beam and the resonant frequency are aligned.

The theory of operation of the system of FIGS. 1A, 1B, 2, and 3 is described with reference to FIGS. 4-6. FIG. 4 depicts an example resonant spectrum 160 of a high Q PBG microresonator, with the resonant frequency being identified as the peak of the resonant spectrum. The resonant frequency of the microresonator may shift either down or up in response to changes in the volume of the void space 120 of the microresonator, as described above with reference to FIGS. 1A and 1B. Changes in the resonant frequency of the microresonator result in changes in light transmission through the microresonator. The changes in light transmission are detected and used as an indicator of probe tip displacement.

Referring to FIGS. 2 and 3, to characterize the surface of the sample 148, a laser beam 162 from the light source 140 is injected into the nanoscale displacement detector 100. A portion of the laser beam passes through the nanoscale displacement detector and is detected by the photodetector 144. In an embodiment, the light source is tuned to output a laser beam at a frequency that is aligned with the resonant frequency of the microresonator 104 in the rest position of the probe tip. FIG. 5A is a graph showing the spectrum 166 of the microresonator 104 and the spectrum 168 of the laser beam generated by light source 140 in the case where the frequency of the laser beam and the resonant frequency of the microresonator are aligned. Because the frequency of the laser beam is aligned with the resonant frequency of the microresonator, most of the laser beam's optical energy will pass through the nanoscale displacement detector. That is, the transfer efficiency of the microresonator at the resonant frequency is typically 50% or greater. If the resonant frequency of the microresonator shifts as described above in response to displacement of the cantilever 102 relative to the microresonator, the frequency of the laser beam may no longer fall within the resonant spectrum of the microresonator and the portion of the laser beam's optical energy that passes through the microresonator will be greatly reduced.

Figure 5B:
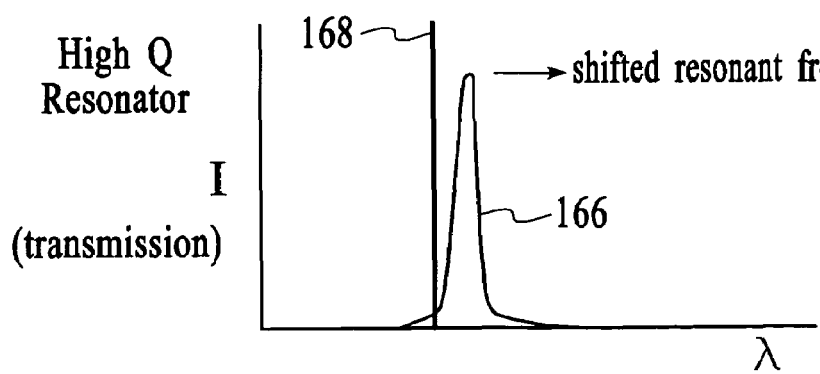
FIG. 5B is a graph showing the spectra from FIG. 5A after the resonant frequency of the resonator has shifted away from the laser beam.
Figure 6:
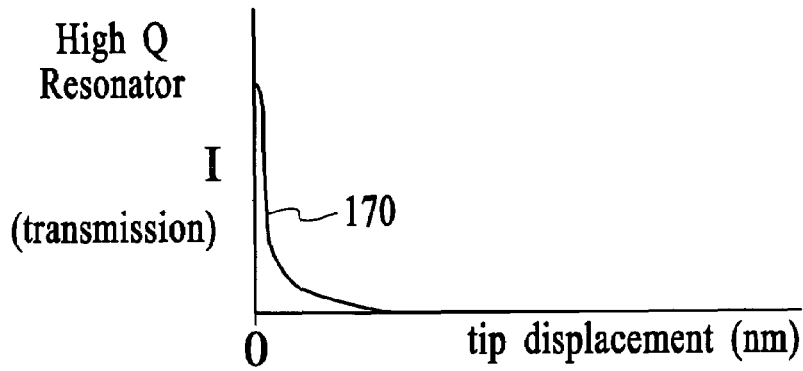
FIG. 6 depicts an exemplary graph of detected optical intensity vs. probe tip displacement for the system of FIG. 2.

FIG. 5B is a graph showing the spectrum 166 of the microresonator 106 and the spectrum 168 of the laser beam after displacement of the probe tip has caused the resonant frequency of the microresonator to shift away from the frequency of the laser beam. As illustrated in FIG. 5B, the resonant frequency of the microresonator and the frequency of the laser beam are no longer aligned and as a result transmission of the laser beam through the microresonator is significantly reduced.

Shifts in the resonant frequency of the microresonator can be detected by monitoring the intensity of the output signal of the photodetector 144. A rapid decrease in the intensity of the photodetector output signal indicates a shift in the resonant frequency of the microresonator 104 away from the frequency of the laser beam. FIG. 6 depicts an exemplary graph of the detected optical intensity 170 vs. probe tip displacement for the system of FIG. 2. As illustrated in the graph of FIG. 6, the detected optical intensity rapidly drops off with probe tip displacement. In an embodiment, changes from high optical intensity to low optical intensity are used to monitor displacement of the cantilever relative to the microresonator and this change can be detected by a photodetector.

Figure 7A:
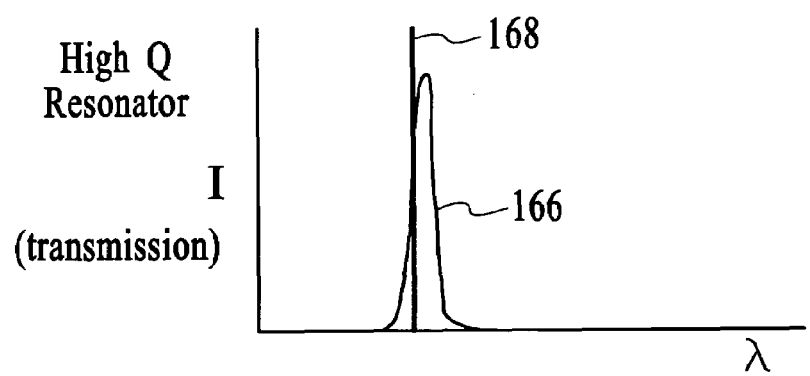
FIG. 7A is a graph showing the spectrum of a microresonator and the spectrum of a laser beam in the case where the frequency of the laser beam is initially aligned at a frequency lower than the peak of the resonance.

In the example described above with reference to FIGS. 5A and 5B, the frequency of the laser beam generated by the light source 140 is initially aligned with the resonant frequency of the microresonator in the rest position of the probe tip 108. However, in another embodiment, the frequency of the laser beam is initially aligned at a frequency higher or lower than the peak of the resonance exhibited by the microresonator. For example, the light source 140 is tuned to a frequency at which the microresonator transmits about half of the transmission at the peak of the resonance. Because the frequency of the laser beam is initially aligned higher or lower than the peak of the resonance, a rapid decrease in transmission power occurs with a smaller shift in the resonant frequency relative to the case where the frequency of the laser beam is initially aligned with the peak of the resonance of the microresonator. This embodiment is described with reference to FIGS. 7A and 7B. FIG. 7A is a graph showing the spectrum 166 of the microresonator 104 and the spectrum 168 of the laser beam generated by light source 140 in the case where the frequency of the laser beam is initially aligned at a frequency lower than the peak of the resonance. Because the frequency of the laser beam is aligned at a frequency lower than the peak of the resonance, less of the laser beam's optical energy passes through the nanoscale displacement detector than with the example described above with reference to FIG. 5A. In an embodiment, the frequency of the laser beam is tuned such that the transfer coefficient of the microresonator in the rest position of the probe tip is near 50%.

Figure 7B:
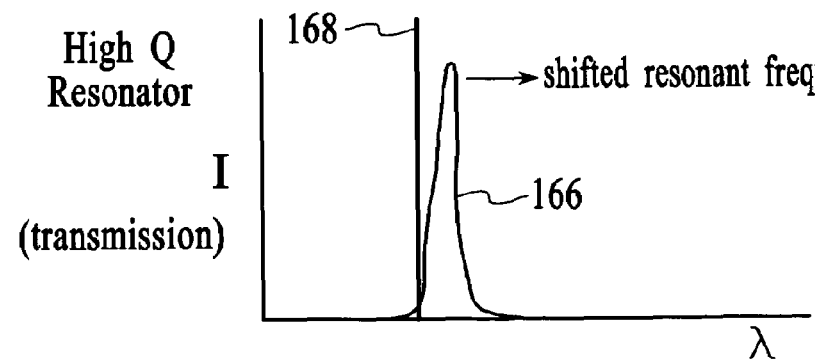
FIG. 7B is a graph showing the spectra from FIG. 7A after the resonant frequency of the microresonator has shifted away from the frequency of the laser beam.

FIG. 7B is a graph showing the spectrum 166 of the microresonator and the spectrum 168 of the laser beam after displacement of the probe tip has caused the resonant frequency of the microresonator to shift away from the frequency of the laser beam. In the embodiment of FIGS. 7A and 7B, the overlap between the spectrum 166 of the microresonator 104 and the spectrum 168 of the laser beam is lost with a smaller shift in the resonant frequency away from the frequency of the laser beam than in the case of FIGS. 5A and 5B. As a result of aligning the frequency of the laser beam to an edge of the resonant spectrum, changes from detecting high optical energy to detecting low optical energy occur in response to a smaller displacement of the cantilever relative to the microresonator, thereby improving the sensitivity to the system. Further, initially aligning the frequency of the laser beam off the peak frequency of the resonance of the microresonator allows the system to distinguish positive from negative displacement of the probe tip relative to the rest position. That is, a decrease in the intensity of the detected optical energy indicates a displacement of the probe tip corresponding to a shift in the resonant frequency away from the frequency of the laser beam while an increase in the intensity of the detected optical energy indicates a displacement of the probe tip corresponding to a shift in the resonant frequency towards the frequency of the laser beam.

Figure 8:
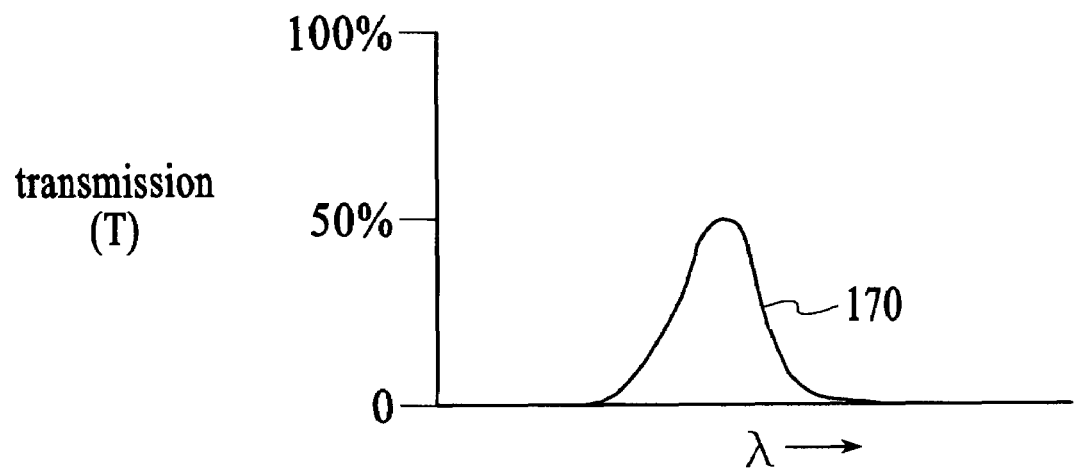
FIG. 8 depicts a response vs. wavelength graph of a transmission mode response.

The system 138 from FIG. 2 is described as working in transmission. In transmission, two optical waveguides are coupled to the microresonator 104 (FIG. 1A) and the laser beam is fed into the microresonator via one waveguide and coupled out of the microresonator via the other waveguide. In an embodiment, the input and output waveguides are symmetrical and thus they can be interchanged with no significant change in behavior. The optical waveguides and the microresonator can be designed so that the presence of the waveguides lowers the effective Q of the microresonator by roughly 50%. Under these circumstances, the transmitted power will be roughly 50% of the applied power (not counting any other losses in the system that are not directly associated with the microresonator). In this case, the wavelength of the laser beam can be aligned with the midpoint of either side of the resonant spectrum and the sensitivity will be the same. The "sign" of the response will be different depending on the initial alignment. FIG. 8 depicts a response vs. wavelength graph of the transmission mode response 170 in the case where roughly 50% of the optical power is detected at the resonant frequency.

Figure 10:
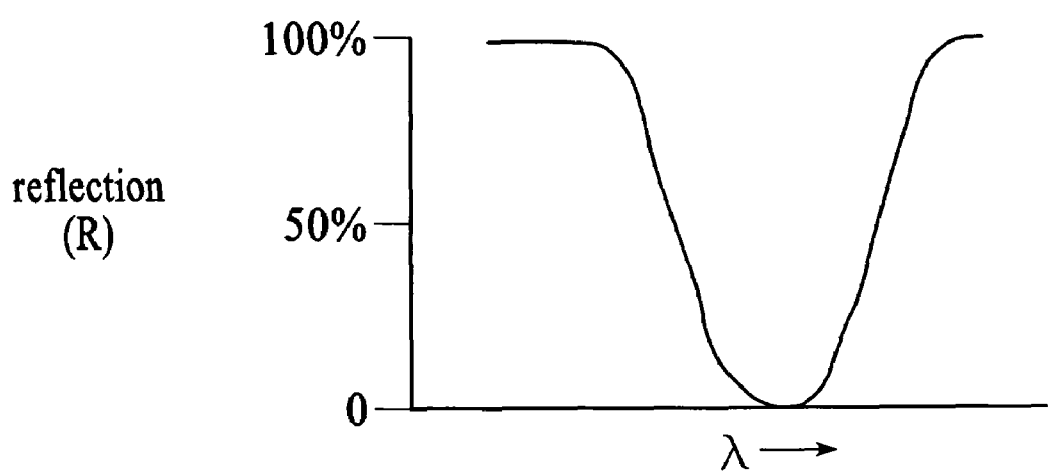
FIG. 10 depicts a response vs. wavelength graph of a reflection mode response.
Figure 9:
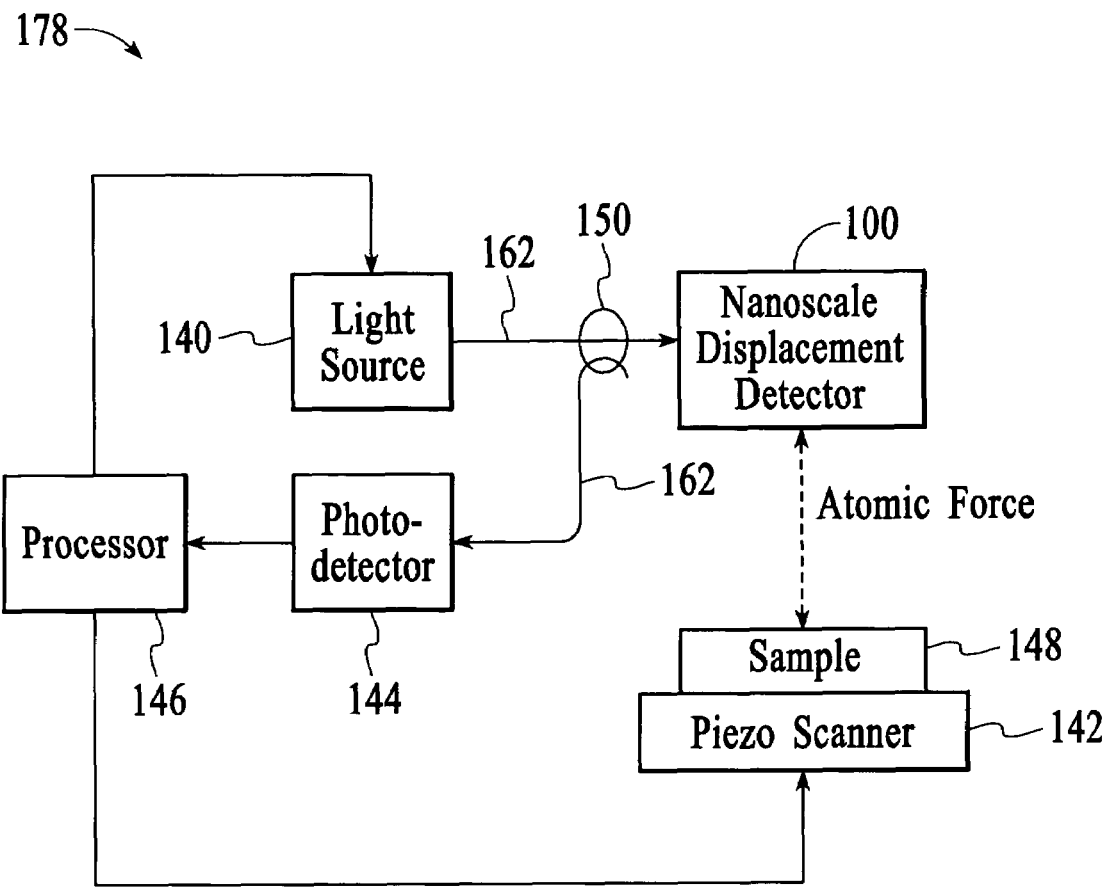
FIG. 9 depicts a system for use in AFM that is similar to the system of FIG. 2 except that it is configured to work in reflection instead of transmission.

A system can also be configured to work in reflection. FIG. 9 depicts a system 178 for use in AFM that is similar to the system 138 of FIG. 2 except that it is configured to work in reflection instead of transmission. In reflection, there is only one waveguide coupled to the microresonator 104 (FIG. 1A) and the reflected signal is separated from the incident signal by means of a directional coupler 150. In an embodiment, the coupling is selected so that the effective Q of the microresonator is diminished by roughly a factor of two. In an ideal case, the reflected power drops to zero at the resonant frequency. FIG. 10 depicts a response vs. wavelength graph of the reflection mode response 172 in the case where none of the optical power is detected at the resonant frequency. The system 138 of FIG. 2 could also be configured to work in transmission by configuring the nanoscale displacement detector with optical systems for separating the reflected and transmitted light.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A nanoscale displacement detector comprising:
   an optical resonator including a first structural feature; and
   a cantilever including a probe tip and a second structural feature engaging with the first structural feature;
   wherein the first and second structural features are configured such that displacement of the cantilever relative to the optical resonator causes a change in the resonant frequency of the optical resonator.

2. The nanoscale displacement detector of claim 1 wherein the first structural feature comprises a cavity within the optical resonator and the second structural feature comprises a protrusion on the cantilever.

3. The nanoscale displacement detector of claim 2 wherein the cavity and protrusion are complementary to each other.

4. The nanoscale displacement detector of claim 2 wherein the protrusion of the cantilever is aligned within the cavity of the optical resonator.

5. The nanoscale displacement detector of claim 2 wherein the protrusion and the cavity are conical.

6. The nanoscale displacement detector of claim 2 wherein the protrusion of the cantilever is separated from the cavity of the optical resonator by a void space, wherein the volume of the void space changes in response to displacement of the cantilever relative to the optical resonator.

7. The nanoscale displacement detector of claim 6 wherein a change in the void space changes the resonant frequency of the optical resonator.

8. The nanoscale displacement detector of claim 7 wherein the optical resonator comprises a photonic bandgap structure.

9. The nanoscale displacement detector of claim 1 wherein the optical resonator comprises a photonic bandgap structure.

10. The nanoscale displacement detector of claim 9 wherein the photonic bandgap structure comprises defects.

11. The nanoscale displacement detector of claim 1 wherein the cantilever is connected to the optical resonator.

12. A nanoscale displacement detector comprising:
    an optical resonator defining a cavity;
    a cantilever coupled to the optical resonator and having a probe tip and a protrusion, the protrusion separated from the cavity of the optical resonator by a void space;
    wherein displacement of the cantilever relative to the optical resonator changes the volume of the void space.

13. The nanoscale displacement detector of claim 12 wherein a change in the volume of the void space changes the resonant frequency of the optical resonator.

14. The nanoscale displacement detector of claim 12 wherein the cavity and protrusion are complementary to each other.

15. The nanoscale displacement detector of claim 12 wherein the protrusion and the cavity are conical.

16. An atomic force microscopy system comprising:
    a light source configured to generate a laser beam;
    a nanoscale displacement detector in optical communication with the light source, the nanoscale displacement detector comprising:
      an optical resonator including a first structural feature; and
      a cantilever including a probe tip and a second structural feature, the second structural feature engaging with the first structural feature;
      wherein the first and second structural features are configured such that displacement of the cantilever relative to the optical resonator causes a change in the resonant frequency of the optical resonator;
    a photodetector optically coupled to the light source by the nanoscale displacement detector, the photodetector configured to detect a portion of the laser beam that optically interacts with the nanoscale displacement detector; and
    a scanner that is adjusted in response to an output signal from the photodetector.

17. The atomic force microscopy system of claim 16 wherein the first structural feature comprises a cavity within the optical resonator and the second structural feature comprises a protrusion on the cantilever.

18. The atomic force microscopy system of claim 17 wherein the cavity and protrusion are complementary to each other.

19. The atomic force microscopy system of claim 17 wherein the protrusion of the cantilever is aligned within the cavity of the optical resonator.

20. The atomic force microscopy system of claim 17 wherein the protrusion of the cantilever is separated from the cavity of the optical resonator by a void space, wherein the volume of the void space changes in response to displacement of the cantilever relative to the optical resonator and wherein a change in the void space changes the resonant frequency of the optical resonator.

21. The atomic force microscopy system of claim 16 wherein the optical resonator comprises a photonic bandgap structure.

* * * * *